United States Patent [19]

Yamagishi et al.

[11] Patent Number: 5,074,650
[45] Date of Patent: Dec. 24, 1991

[54] STEREOMICROSCOPE INCLUDING AN OBJECTIVE WITH POSITIVE AND NEGATIVE MENISCUS LENSES AND WITH OPTICAL AXES INTERSECTING BEYOND THE OBJECT

[75] Inventors: Masaaki Yamagishi; Fukuo Komaba, both of Hachiouji, Japan

[73] Assignee: Olympus Optical Co., Ltd., Tokyo, Japan

[21] Appl. No.: 698,185

[22] Filed: May 6, 1991

Related U.S. Application Data

[63] Continuation of Ser. No. 439,816, Nov. 21, 1989, abandoned.

[30] Foreign Application Priority Data

Nov. 22, 1988 [JP] Japan .............................. 63-295190

[51] Int. Cl.$^5$ .......................... G02B 21/22; G02B 9/10; G02B 21/02
[52] U.S. Cl. .................................... 359/377; 359/661; 359/795
[58] Field of Search ................ 350/516, 515, 414, 481

[56] References Cited

U.S. PATENT DOCUMENTS

| 3,353,892 | 11/1967 | Minns et al. | |
|---|---|---|---|
| 4,448,498 | 5/1984 | Muller et al. | 350/516 |
| 4,640,586 | 2/1987 | Iba et al. | 350/515 |

FOREIGN PATENT DOCUMENTS

| 332025 | 1/1921 | Fed. Rep. of Germany | 350/516 |
|---|---|---|---|
| 2021864 | 10/1971 | Fed. Rep. of Germany | 350/516 |
| 53-17410 | 6/1978 | Japan . | |
| 58-203411 | 11/1983 | Japan . | |
| 60-641 | 1/1985 | Japan . | |
| 61-39017 | 2/1986 | Japan . | |

Primary Examiner—Jon W. Henry
Attorney, Agent, or Firm—Cushman, Darby & Cushman

[57] ABSTRACT

A stereomicroscope includes an objective lens used in common and a pair of observing optical systems on the left and right sides, arranged behind the objective lens so that optical axes of the observing optical systems are symmetrically arranged at a predetermined angle with respect to an optical axis of the objective lens. In the stereomicroscope, the objective lens may be arranged so that a focal length of the objective lens has a positive value and an object is located closer to the objective lens than an object focal point of the object lens, and thereby an image which is high in resolution and favorable in flatness is brought about.

5 Claims, 5 Drawing Sheets

STEREOMICROSCOPE INCLUDING AN OBJECTIVE WITH POSITIVE AND NEGATIVE MENISCUS LENSES AND WITH OPTICAL AXES INTERSECTING BEYOND THE OBJECT

This is a continuation of application Ser. No. 439,816, filed on Nov. 21, 1989, which was abandoned upon the filing hereof.

BACKGROUND OF THE INVENTION a) Field of the invention

This invention relates to a stereomicroscope.

b) Description of the prior art

Stereomicroscopes are broadly classified into two systems: a Greenough type stereomicroscope provided with two observing optical systems whose optical axes are bisymmetrically arranged at a predetermined angle (which will be hereinafter referred to as an internal inclination angle) to observe an object with eyes and a Galileo type stereomicroscope provided with a single objective lens, used in common, arranged so that afocal images are formed by emanated beams of light and two observing optical systems arranged bisymmetrically, in parallel with each other, behind the single objective lens to observe the images with eyes.

FIG. 1 shows the optical system of the Greenough type stereomicroscope. In this figure, reference symbols $V_L$ and $V_R$ designate optical axes of observing optical systems disposed on the left and right sides, respectively; $\theta$ an internal inclination angle; numerals 1 and 1' first lens components on the left and right sides, respectively; 2 an object surface; 3 and 3' second lens components on the left and right sides, respectively; 4 and 4' image rotator prisms, on the left and right sides, changing real images formed by the second lens components 3, 3' to orthographic images, respectively; and 5 and 5' eyepieces, on the left and right sides, respectively, for magnifying and observing the orthographic real images.

FIG. 2 depicts the optical system of the Galileo type stereomicroscope. In this figure, reference symbols $V_L$ and $V_R$ represent the optical axes of the observing optical systems arranged on the left and right sides, respectively; numeral 2 the object surface; 6 a single objective lens used in common; 7 and 7' imaging lenses, on the left and right sides, respectively, changing afocal images formed by the single objective lens to real images; 4 and 4' the image rotator prisms, on the left and right sides, respectively, changing the real images to orthographic images; and 5 and 5' the eyepieces on the left and right sides, respectively.

Although the Galileo type stereomicroscope has the defect that an image plane is viewed to swell up in a convex shape as will be described later, such a defect is obviated by an improved stereomicroscope of Japanese Patent Preliminary Publication No. Sho 61-39017.

The Greenough type stereomicroscope, on the one hand, has possessed the defect that flatness of an image is poor on principle because the object surface is not perpendicular to each of the optical axes on the left and right sides. This respect will be described in detail as follows:

FIG. 3 is an enlarged view of a range M of FIG. 1 and shows the relationship between the depth of field and the internal inclination angle in the object surface 2. In this figure, reference symbol 0 represents a center of a visual field, that is, an intersection of the optical axis $V_L$ with the optical axis $V_R$; $L_1$ a straight line where a plane including the optical axes $V_L$, $V_R$ intersects with the object surface 2; $L_2$ a straight line where the plane including the optical axes $V_L$, $V_R$ intersects with a plane including the point 0, normal to the optical axis $V_L$; A and B ends of the visual field on the straight line $L_1$ (that is, the length of a segment AB corresponds to the range of the visual field); $\Delta d$ a depth of field on an object side in the observing optical system on the left side; Na and Nb straight lines, parallel to the straight line $L_2$, at the ends of the range of the depth of field; and C and D intersections of the straight lines Na and Nb with the straight line $L_1$, respectively.

As is obvious from FIG. 3, in the observing optical system on the left side, observation can be made without blur between the lines Na and Nb, namely, in the range of the depth of field $\Delta d$. Thus, on the line $L_1$, a segment between the points C and D is the range in which observation can be made without any blur. Here, because the range of the visual field lies between the points A and B, the flatness of the image in such an instance comes to CD/AB and is unlikely to become larger, that is, better.

Also, for the intention of bringing about high resolution, it is only necessary that the aperture of each of the first lens components of the observing optical systems on the left and right sides is increased to secure a larger numerical aperture (N. A.). However, since the first lens components are arranged at the internal inclination angle, such a situation that the first lens components on the left and right sides come into contact with each other is regarded as the upper limit of the size of the apertures of the first lens components. Accordingly, this stereomicroscopic system will also be limited in resolution. In addition to this, the system has the disadvantage inconsistent with the principle that the depth of field decreases as the numerical aperture is made larger and consequently the flatness of the image deteriorates. Specifically, since the relationship between them is such that the depth of field $\Delta d$ is inversely proportional to the square of the numerical aperture of the observing optical system, the depth of field $\Delta d$ decreases rapidly as the numerical aperture is made larger, that is, the resolution higher, and the value of the segment CD also diminishes. In other words, the flatness of the image will grow worse.

On the other hand, the Galileo type stereomicroscope has had the drawback that since the use of the single objective lens 6 with a low manufacturing cost composed of one to three lenses brings about the generation of asymmetric distortion onto the afocal image derived from the single objective lens 6, a plane-shaped specimen is not observed as a plane as it is, but viewed to swell up in a convex shape.

Although this drawback is obviated by making use of the single objective lens of the stereomicroscope set forth in the Sho 61-39017, problems have been encountered that the number of lenses constituted in such a case increases with resultant high manufacturing costs.

This respect will be mentioned in detail as follows:

FIG. 4 is cited from FIG. 2 of the Sho 61-39017. In this figure reference symbols $V_L$ and $V_R$ designate the optical axes of the observing optical systems disposed on the left and right sides, respectively; numeral 6 the single objective lens; 2 the object surface; 7 and 7' the imaging lens on the left and right sides, respectively; symbol P a given point on a Y axis included in the object surface 2; $V_1$ and $V_2$ rays of light emanating from the point P to pass through the centers of pupils of the observing optical systems on the left and right sides, respectively; and $\theta_L$, and $\theta_R$, angles made by the light rays $V_1$, $V_2$ with the optical axes $V_L$, $V_R$, respectively, immediately after the light rays $V_1$, $V_2$ emerge from the single objective lens 6. According to the Sho 61-39017, in order that the image formed by the single objective lens 6 is devoid of the asymmetric distortion and the planate specimen is observed as a plane as it is, there are indications that the angles $\theta_L$ and $\theta_R$ will profit from the use of the single objective lens 6 such as to satisfy the following equation:

$$\left| \frac{\theta_R - \theta_L}{\theta_R} \right| < 0.00775.$$

However, as seen from FIGS. 5A and 5B cited from the views of Embodiments 1 and 3, respectively, of the Sho 61-39017, a lens configuration such that the angles $\theta_L$ and $\theta_R$ shown in FIG. 4 are to satisfy the equation:

$$\left| \frac{\theta_R - \theta_L}{\theta_R} \right| < 0.00775$$

in the Galileo type stereomicroscope will need more than four lenses constituting the objective lens 6 and will be rendered considerably complicated.

SUMMARY OF THE INVENTION

The object of the present invention, in view of the above problems, is to provide a stereomicroscope which, in spite of use of a single objective lens with a simple configuration, is devoid of swell of an image, high in resolution, and has favorable flatness for the image.

The stereomicroscope according to the present invention is designed to be provided with a first optical system which is a single objective lens used in common and a second optical system which is a pair of observing optical systems disposed, behind the first optical system, on the left and right sides so that optical axes on the left and right sides of the second optical system are symmetrically arranged at a predetermined angle with respect to an optical axis of the first optical system and thereby, in spite of use of the single objective lens with a small number of lens components, a specimen assuming a plane shape can be observed as a plane as it is without any swell of the image.

Further, the stereomicroscope according to the present invention is such that the first optical system is arranged so that a focal length of the entire first optical system is made positive and an object is positioned closer to the first optical system than an object focal point of the first optical system, and thereby a virtual image of the object magnified by the first optical system is formed so that high resolution is secured.

Still, the stereomicroscope according to the present invention is such that the first optical system is constructed to have such optical performance that a plane normal to the optical axis of the first optical system is approximately projected on a plane normal to each of the optical axes of the observing optical systems on the left and right sides of the second optical system, and thereby high resolution is held so that good flatness of the image is brought about even when the depth of field is reduced.

This and other objects as well as the features and the advantages of the present invention will become apparent from the following detailed description of the preferred embodiment when taken in conjunction with the accompanying drawings.

BRIEF DESCRIPTION OF THE DRAWINGS

in FIG. 7;

DESCRIPTION OF THE PREFERRED EMBODIMENT

Figure 1:
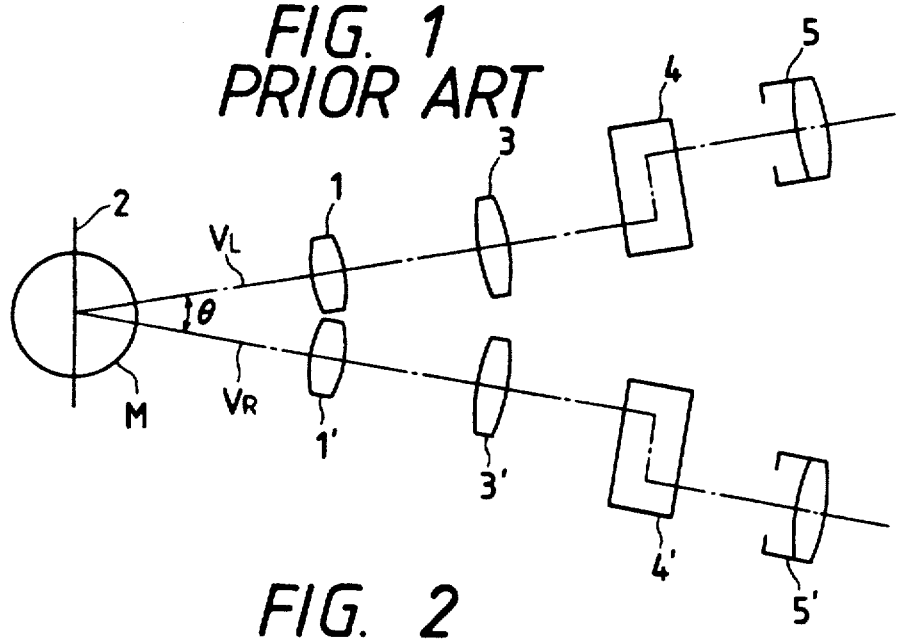
FIGS. 1 and 2 are views showing optical systems of Greenough and Galileo type stereomicroscopes as conventional examples, respectively.
Figure 2:
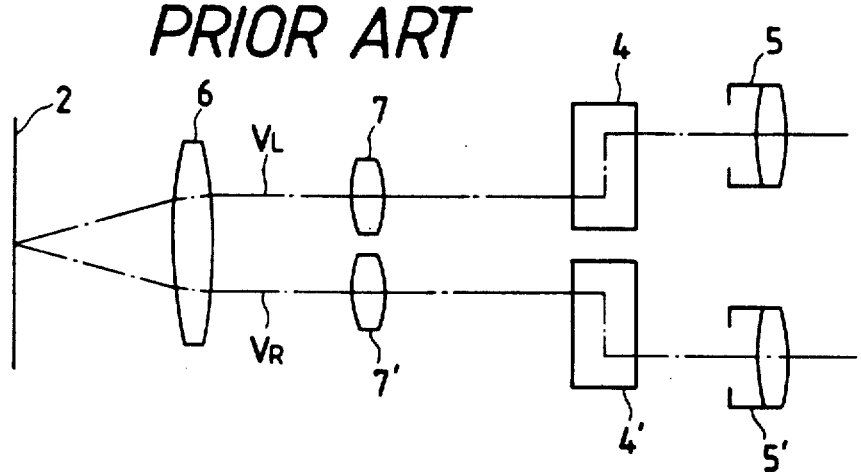
Figure 3:
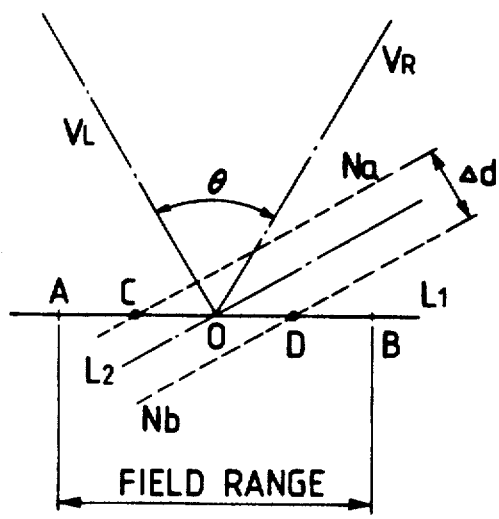
FIG. 3 is an enlarged view showing an essential part of FIG. 1.

In accordance with the embodiment shown in the drawings, the present invention will be described in detail below.

Figure 6:
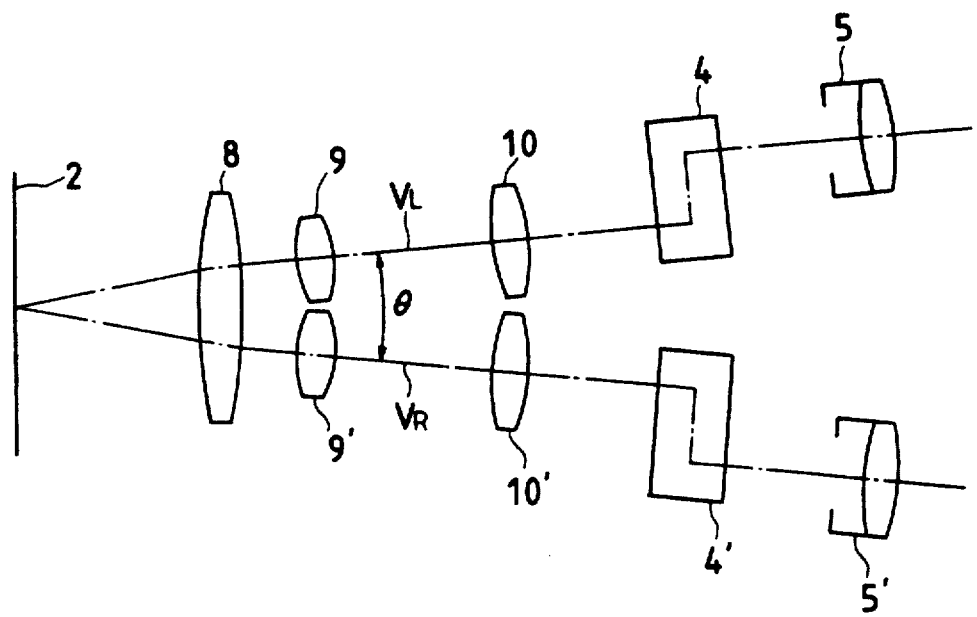
FIG. 6 is a view showing an optical system of an embodiment of a stereomicroscope according to the present invention.

FIG. 6 shows the optical system of an embodiment of the stereomicroscope according to the present invention. In this figure, reference symbols $V_L$ and $V_R$ represent optical axes of the observing optical systems arranged on the left and right sides, respectively; numeral 8 a single objective lens used in common; 2 the object surface; 9 and 9' first lens components on the left and right sides, respectively; 10 and 10' second lens components on the left and right sides, respectively; 4 and 4' the image rotator prisms on the left and right sides, respectively; and 5 and 5' the eyepieces on the left and right sides, respectively. Of this optical system, the single objective lens 8 constructs a first optical system, and the first lens components 9 and 9', the second lens components 10 and 10', the image rotator prisms 4 and 4' and the eyepieces 5 and 5' constitute a second optical system. Also, an angle (internal inclination angle) made by the optical axes $V_L$, $V_R$ on the left and right sides, respectively, of the second optical system is represented by symbol $\theta$.

Figure 4:
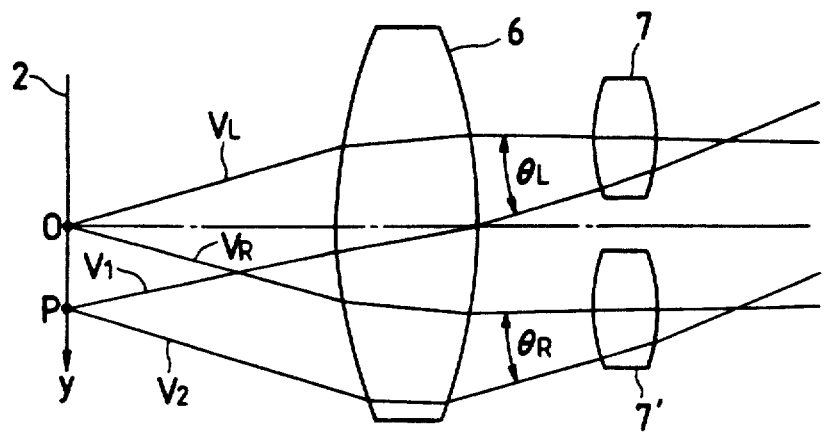
FIG. 4 is a view cited from FIG. 2 of Japanese Patent Preliminary Publication No. Sho. 61-39017.
Figure 5A:
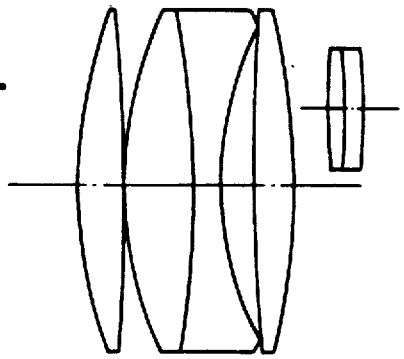
FIGS. 5A and 5B are views cited from the view of Embodiments 1 and 3 of the above Publication, respectively.
Figure 5B:
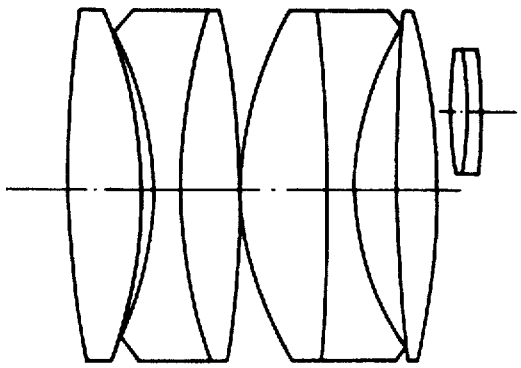

First of all, description will be given, by referring to FIG. 7 while comparing with FIG. 4, as to the reasons why, in spite of use of the single objective lens with a simple configuration, the specimen of a plane shape can be observed as a plane as it is without being viewed to swell up in a convex shape.

Figure 7:
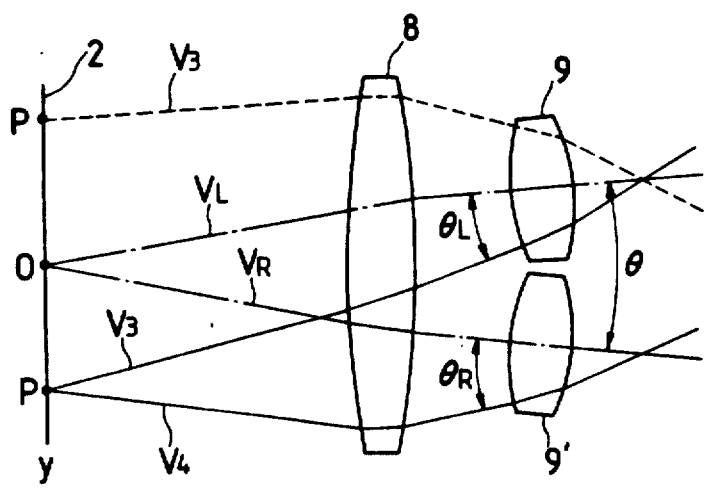
FIG. 7 is a enlarged view showing an essential part of FIG. 6.

FIG. 7 is an enlarged view showing an essential part of FIG. 6 between the object surface 2 and the first lens components 9, 9'. In this figure, reference symbol P the given point on the Y axis included in the object surface 2; $V_3$ and $V_4$ rays of light emanating from the point P to traverse the centers of pupils of the observing optical systems on the left and right sides, respectively; $\theta_L$ and $\theta_R$ angles made by the rays $V_3$ and $V_4$ with the optical axes $V_L$ and $V_R$, respectively, immediately after the rays $V_3$ and $V_4$ emerge from the single objective lens 8; and $\theta$ the internal inclination angle made by the optical axes on the left and right sides of the second optical system. As stated above, according to the Sho 61-39017, the condition that the planate specimen is observed as a plane as it is, is that even in FIG. 7, like the case of FIG. 4, the single objective lens 8 is employed such as to satisfy the following equation:

$$\left| \frac{\theta_R - \theta_L}{\theta_R} \right| < 0.00775.$$

Figure 8:
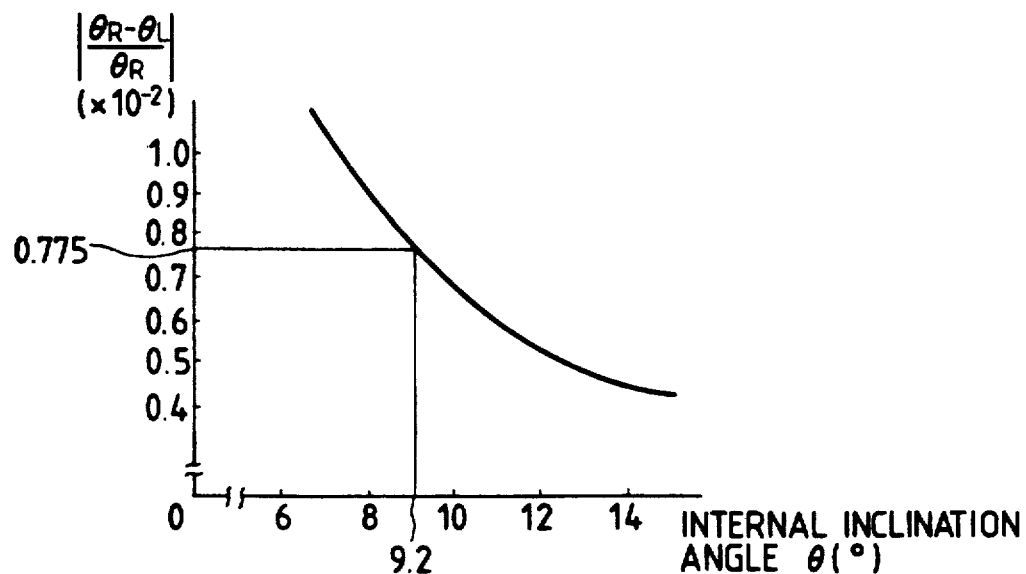
FIG. 8 is a diagram showing the relationship between the internal inclination angle $\theta$ and the value of $$\left| \frac{\theta_R - \theta_L}{\theta_R} \right|$$

Here, the single objective lens 8 is assumed, for example, to be a two-lens configuration having the following numerical data and the relationship between the internal inclination angle $\theta$ and the value of $$\left| \frac{\theta_R - \theta_L}{\theta_R} \right|$$

in FIG. 7 is shown in FIG. 8.

| $r_1 = 68.102$ | | |
| --- | --- | --- |
| | $d_1 = 6.7$, | $n_1 = 1.48823$ |
| $r_2 = -175.941$ | | |
| | $d_2 = 0.5$, | |
| $r_3 = 73.4601$ | | |
| | $d_3 = 4.2$, | $n_2 = 1.53714$ |
| $r_4 = 44.914$ | | | where reference symbols $r_1$ to $r_4$ represent radii of curvature of respective lens surfaces, $d_1$ to $d_3$ thicknesses of respective lenses and airspaces between them, and $n_1$ and $n_2$ refractive indices of respective lenses.

As seen from FIG. 8, when the internal inclination angle $\theta$ reduces, the value of $$\left| \frac{\theta_R - \theta_L}{\theta_R} \right|$$

increases accordingly and the planate specimen will be observed to swell up in a convex shape. Contrary, the value of $$\left| \frac{\theta_R - \theta_L}{\theta_R} \right|$$

diminishes as the angle $\theta$ increases. In such an instance, when $$\theta > 9.2°, \left| \frac{\theta_R - \theta_L}{\theta_R} \right| < 0.00775$$

consequently the planate specimen is observed as a plane as it is. Thus, the optical systems on the left and right sides of the second optical system are arranged to form a predetermined internal inclination angle $\theta$, thereby enabling the planate specimen to be observed as a plane as it is without any swell of the convex shape, in spite of the use of the single objective lens with a simple configuration that the number of lenses is only two. Also, when the internal inclination angle $\theta$ exceeds 14°, the second optical system bulks considerably in size, so that it is desirable that the upper limit of magnitude of the internal inclination angle is about 14° and 10-12° in practical use.

Next, description will be given that high resolution is brought about in the embodiment.

When the internal inclination angle $\theta$ is provided in the optical systems, arranged bilaterally, of the second optical system, extension lines of the optical axes of the bilateral optical systems will intersect at a position located in front of the object surface 2. Accordingly, it follows from this that, with a view to allowing an object image to be formed by the single objective lens 8 at this point, the single objective lens 8 should have a positive refracting power and the object surface 2 is arranged to be positioned closer to the single objective lens 8 than its front focal point. Thus, since the single objective lens 8 serves as a magnification system forming a magnified virtual image of the object at the position of the above intersection, the numerical aperture on the object side of the stereomicroscope is to have a value multiplying a value depending on the aperture of each of the first lens components 9 and 9' in the second optical system by the magnification of the single objective lens 8 and can be increased for the magnification per se, with the result that the improvement of resolution is materialized.

Subsequently, explanation will be made that flatness of the image is favorable in the embodiment.

The conventional single objective lens is designed to project the object, namely, the object surface 2 on a plane normal to its optical axis. According to the lens configuration of the optical system of the embodiment shown in FIG. 6, however, respective planes normal to the optical axes of the second optical system located in the rear of the first optical system which is the single objective lens 8 and the first lens components 9, 9' incline relatively by $\frac{1}{2}$ of the internal inclination angle $\theta$. As such, in the case where the conventional single objective lens is applied to the first optical system, the image of the object surface projected to the second optical system thereby fails to be formed into the plane normal to each optical axis of the second optical system and instead, will have a plane inclining by $\frac{1}{2}$ of the internal inclination angle $\theta$. The conventional objective lens is configured in particular so that a good image is secured in the case of the internal inclination angle $\theta=0$ in the second optical system and therefore, if it is combined with the optical system of the internal inclination angle $\theta \neq 0$, the inclination of the image surface to the plane normal to each optical axis of the second optical system will further increase.

Figure 9:
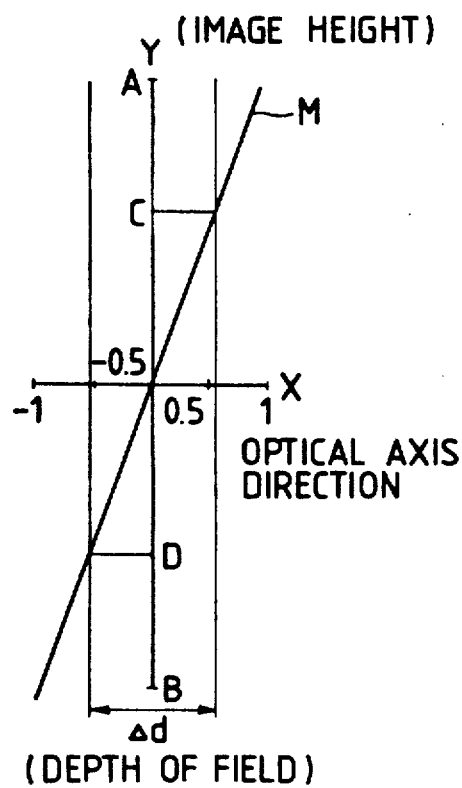
FIG. 9 is a diagram showing the relationship between the object surface projected by a first optical system making use of a conventional single objective lens and the plane normal to each of optical axes of a second optical system.

FIG. 9 shows the relationship between the object surface projected by the first optical system making use of the conventional single objective lens and the plane normal to each optical axis of the second optical system. In this diagram, an X axis represents a direction of each optical axis of the second optical system; a Y axis a direction of the plane normal to each optical axis of the second optical system; symbol M the image of the object surface projected by the first optical system; a segment AB the range of a visual field in the second optical system; and Δd the depth of field in the case where the magnification of the second optical system is assumed to be 1× and that of the eyepiece is 10×.

Here, although a projected image of the object surface can be observed free from blur when located within the range of the depth of Field Δd, the flatness of the image is CD/AB=0.56 in the case of this diagram, so that only 56% of the field range allows the image to be favorably observed without blur. Since, however, the image formed by the first optical system is projected to the second optical system by a non-coaxial optical system, the correction of curvature of field generated in the first optical system is intentionally adjusted and thereby the image of the object surface can be placed within the range of the depth of field Δd in FIG. 9, with the result that the flatness of the image can be extensively improved. In FIG. 7, in which the axis Y represents the coordinate on the object surface with an origin at an intersection 0 with the optical axis of the single objective lens, the correction of the curvature of field is made excessive when the point P lies at the position of Y<0 and it is made insufficient when the point P lies at Y>0, thereby making it possible to form the entire image surface into a plane with inclination.

Figure 10:
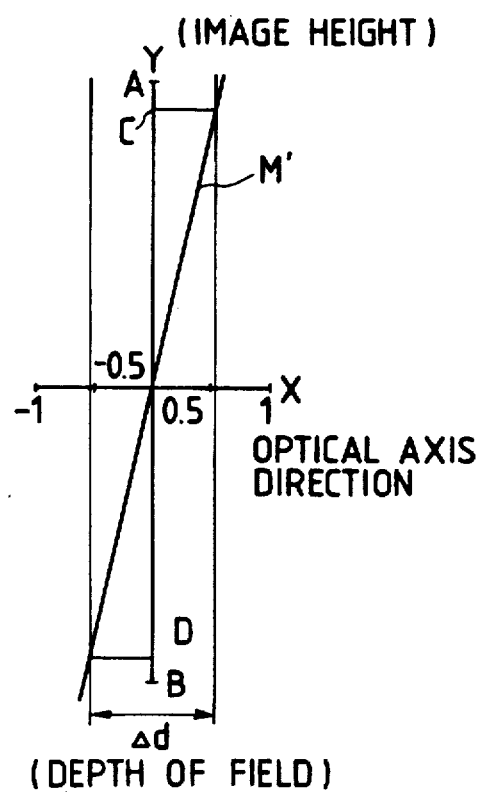
FIG. 10 is a diagram showing the relationship between the object surface projected by the first optical system making use of a single objective lens of the above embodiment and the plane normal to each of the optical axes of the second optical system.

FIG. 10 is a diagram showing, in accordance with FIG. 9, the relationship between the image of the object surface projected by the first optical system making use of the single objective lens 8 according to the embodiment and the plane normal to each optical axis of the second optical system. Reference symbol M' denotes the image of the object surface projected by the first optical system, which is curved by the curvature of field whose correction is intentionally adjusted by the first optical system. The flatness of the image in this diagram is CD/AB=0.92, namely, is such that 92% of the field range AB is included in the depth of field Δd to allow the image to be observed free from blur. This means that the image of the object surface is approximately projected onto the plane normal to each optical axis of the second optical system by the first optical system. Further, even though the depth of field Δd is diminished due to the observation with high resolution, most of the field range can be included in the depth of field Δd by changing the extent of the correction of the curvature of field in the first optical system.

The single objective lens 8 for satisfying the points mentioned above, as depicted in FIG. 11, may be such as to be constructed from a first lens component with a positive refracting power, directing a convex surface toward the object and a second lens component with a negative refracting power, directing a concave surface toward the second optical system. Now, with respect to the ray $V_3$ in FIG. 7, the direction of the arrow of the Y axis is taken as positive and when the point P is located at Y<0 (as indicated by a dotted line), the curvature of field on the convex surface of the first lens component is changed to a state of insufficient correction, followed by a state of excessive correction of that on the concave surface of the second lens component. Here, when the refracting power of the convex surface of the first lens component is represented by $\phi_1$ and that of the concave surface of the second lens component by $\phi_4$ to be assumed as $|\phi_1| < |\phi_4|$, the ray $V_3$ is such that the curvature of field turns to the state of excessive correction as a whole. On the other hand, when the point P lies at the position of Y>0 (as indicated by a solid line), the ray $V_3$ is such that although the curvature of field on the convex surface of the first lens component is made to be in the state of insufficient correction, the ray is incident on the position near the center of the concave surface of the second lens component and consequently the curvature of field on the concave surface is not largely corrected and turns to the state of insufficient correction as a whole. Hence, the image surface available can be changed to a plane with inclination and the flatness of the image can be improved.

As discussed above, in the stereomicroscope provided with the single objective lens 8 used in common, for example, in the optical system on the left side, a beam of light traverses a position near the optical axis of the single objective lens 8 when y>0 and a position for therefrom when y<0 to be incident on the second optical system, so that the image surface can be unsymmetrically inclined in regard to the optical axis of the second optical system and the flatness of the image can be improved.

Figure 11:
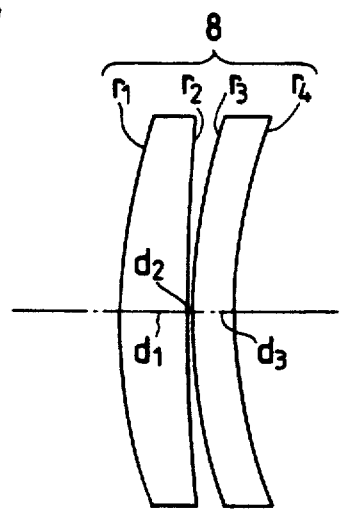
FIG. 11 is a view showing a concrete configuration of the single objective lens of the above embodiment.

An example of the numerical data of the single objective lens depicted in FIG. 11 is shown in the following.

---

$r_1 = 68.486$ $d_1 = 6.7, n_1 = 1.48823$ $r_2 = 215.646$ $d_2 = 0.5$ $r_3 = 72.703$ $d_3 = 4.2, n_2 = 1.6038$ $r_4 = 53.414$ $WD = 82.116, \beta = 1.17 \times$ $\left| \dfrac{\theta_R - \theta_L}{\theta_R} \right| = 0.00766$ $|\phi_1| = 0.00713$ $|\phi_4| = 0.01167$

--- where reference symbols $r_1$ to $r_4$ represent radii of curvature of respective lens surfaces, $d_1$ to $d_3$ thicknesses of respective lenses and airspaces between them, $n_1$ and $n_2$ refractive indices of respective lenses, WD the working distance, and $\beta$ the projecting magnification. Also, the internal inclination angle of the second optical system is 10°.

Figure 12:
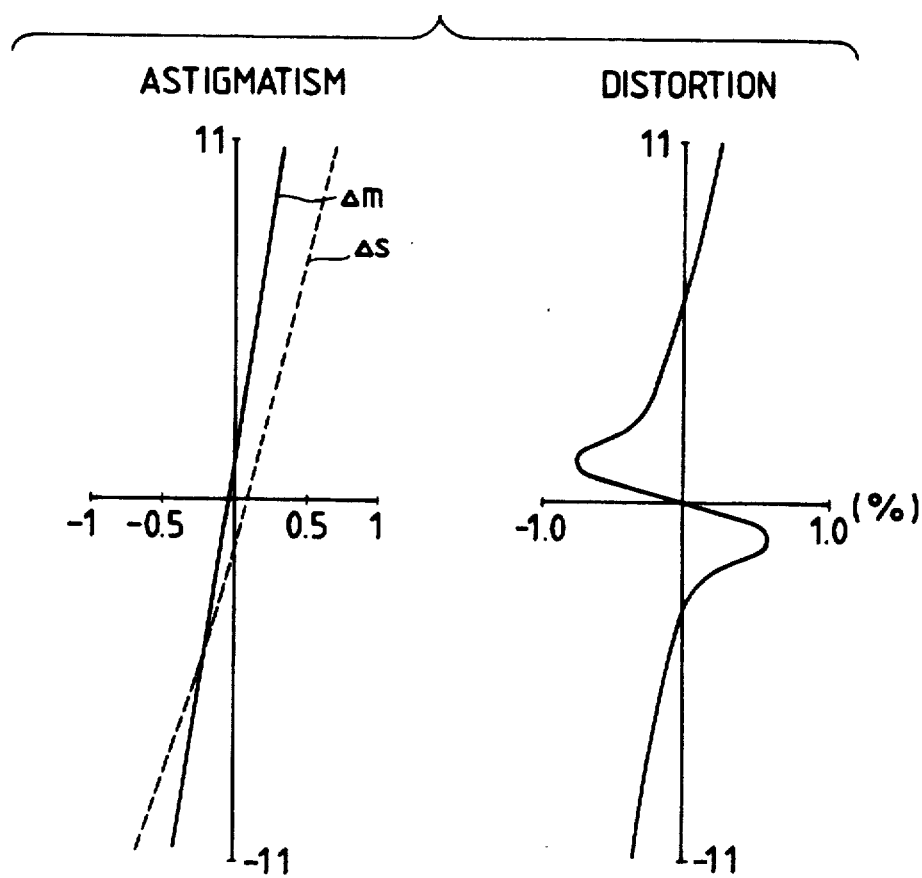
FIG. 12 is aberration diagrams of a numerical value example of the single objective lens shown in FIG. 11.

FIG. 12 is aberration diagrams of this numerical data example.

As described above, the stereomicroscope according to the present invention has advantages of significance in practical use that, in spite of the use of the single objective lens with a simple configuration, the swell of the image is not produced, resolution is high, and the flatness of the image is favorable.

What is claimed is:

1. A stereomicroscope, comprising:

an objective lens used in common; and a pair of observing optical systems on left and right sides, arranged behind said objective lens to observe an object with eyes;

said objective lens including a positive meniscus lens component having a convex surface directed toward the object and being positioned on the side closest to the object, and a negative meniscus lens component having a concave surface directed toward said observing optical systems and being positioned on the side closest to said observing optical systems, said objective lens having a positive focal length as a whole and satisfying the condition $|\phi_1| < |\phi_4|$ where the symbols $\phi_1$ and $\phi_4$ represent refracting powers of said convex and concave surfaces of said positive and negative meniscus lens components, respectively;

said pair of observing optical systems being arranged so that optical axes of said observing optical systems are symmetrically positioned at a predetermined inclination angle with respect to an optical axis of said objective lens; and said predetermined inclination angle being set so that said optical axes of said pair of observing optical systems intersect with one another on an object side with respect to said objective lens used in common and at a position more distant from said objective lens than the object.

2. A stereomicroscope according to claim 1, wherein said objective lens is arranged so that the object is located closer to said objective lens that an object focal point of said objective lens.

3. A stereomicroscope according to claim 1 or 2, wherein an image of the object projected by said objective lens is formed on a plane normal substantially to each of the optical axes of said pair of observing optical systems.

4. A stereomicroscope according to claim 1, wherein said predetermined inclination angle is set within a range of 9.2° to 14°.

5. A stereomicroscope according to claim 3, wherein said objective lens consists of said positive meniscus lens component and said negative meniscus lens component.

* * * * *